United States Patent [19]
Esters

[11] Patent Number: 5,441,366
[45] Date of Patent: Aug. 15, 1995

[54] METHOD AND APPARATUS FOR COMPACTING GARBAGE DUMPS BY MEANS OF DEPTH VIBRATION

[75] Inventor: Klaus Esters, Essen, Germany

[73] Assignee: Hayward Baker Inc., Odenton, Md.

[21] Appl. No.: 100,679

[22] Filed: Aug. 2, 1993

[30] Foreign Application Priority Data

Aug. 27, 1992 [DE] Germany .......... 42 28 542.9

[51] Int. Cl.⁶ .......... B09B 1/00; E02D 3/11
[52] U.S. Cl. .......... 405/129; 405/130
[58] Field of Search .......... 405/128, 129, 258, 271, 405/130; 588/249, 250; 299/12

[56] References Cited

U.S. PATENT DOCUMENTS

| | | | |
|---|---|---|---|
| 3,720,065 | 3/1973 | Sherard | 405/130 |
| 3,943,722 | 3/1976 | Ross | 405/130 |
| 4,157,016 | 6/1979 | Wendt et al. | 405/130 X |
| 4,836,716 | 6/1989 | Spalding et al. | 405/130 X |
| 4,860,544 | 8/1989 | Krieg et al. | 405/130 X |
| 5,195,887 | 3/1993 | Peterson et al. | 432/14 |
| 5,273,344 | 12/1993 | Volkwein et al. | 299/12 |

FOREIGN PATENT DOCUMENTS

| | | | |
|---|---|---|---|
| 2491106 | 4/1982 | France | 405/130 |
| 2856144 | 7/1980 | Germany . | |
| 3016841 | 11/1984 | Germany . | |

OTHER PUBLICATIONS

DE-Z: Greenwood, D. A. Baugrundverbesserung durch Tiefenverdichtung. In. Baumaschine Und Bautechnik, 19. Jg., H.9, Sep. 1972, S.367-375.

*Primary Examiner*—John A. Ricci
*Attorney, Agent, or Firm*—Ladas & Parry

[57] ABSTRACT

For a method for compacting garbage dumps (10) by means of depth vibration, which is carried out by means of at least one depth vibrator (4) and puts the dump mass (1, 2, 3) into vibration, one area after another, and compacts it in this way, with depth vibration taking place while a flushing fluid is added, it is provided that liquid nitrogen (8) is added as the flushing fluid during depth vibration. The apparatus for implementing this method is structured in such a way that the depth vibrator (4) has a separate flushing fluid line (9) to feed liquid nitrogen (8) into the bore hole.

12 Claims, 1 Drawing Sheet

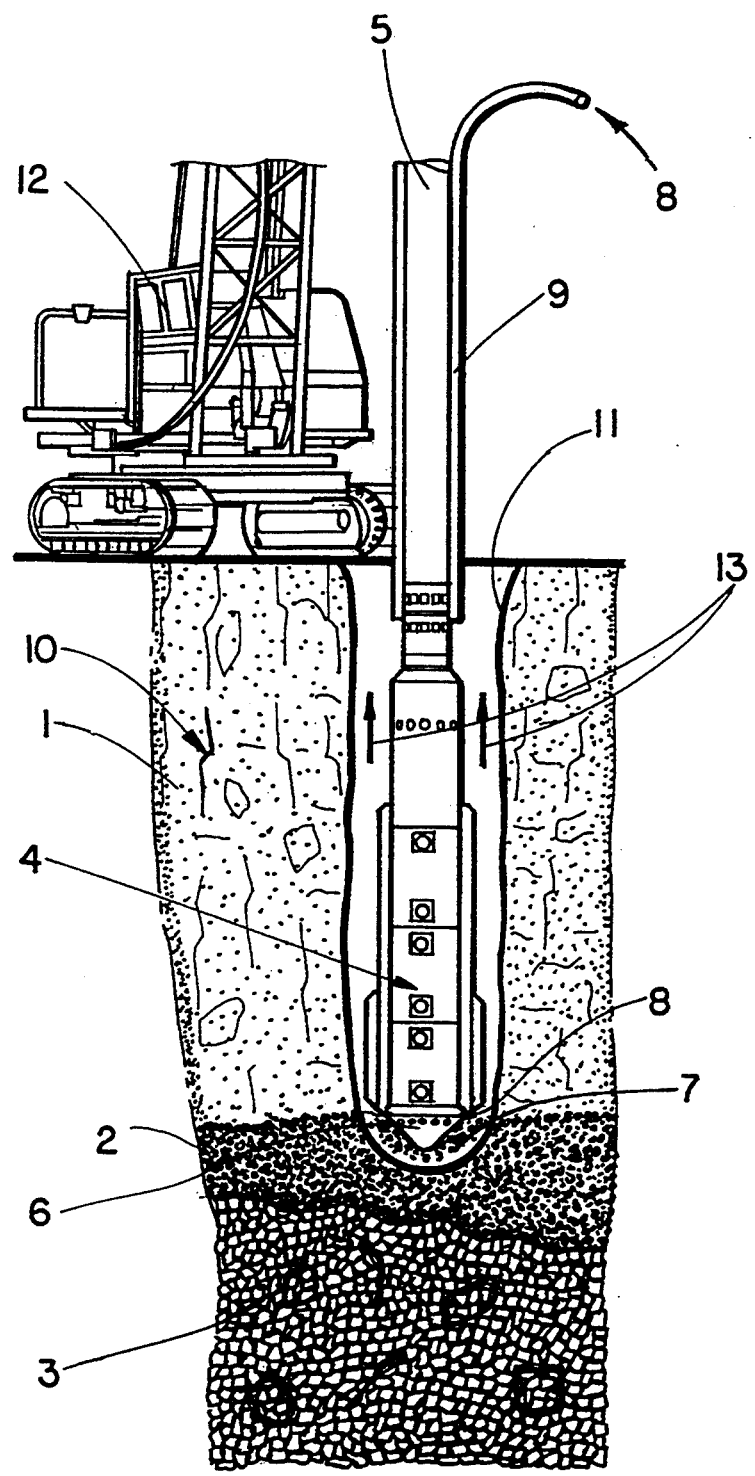

METHOD AND APPARATUS FOR COMPACTING GARBAGE DUMPS BY MEANS OF DEPTH VIBRATION

The invention relates to a method for compacting garbage dumps by means of depth vibration, as well as an apparatus provided for implementation of the method.

It is known (see, for example, brochure 10-2D of the applicant, 8/1991) to carry out compacting of loosely piled garbage dumps by means of the so-called depth vibration method. This is done by means of at least one depth vibrator, with the dump mass being put into vibration, one area after another, and being compacted by this means.

Garbage dumps are understood to be all possible deposits or piles or fills of waste materials, with such dumps being established and operated both as piles and as fills of gravel pits, strip mines, etc.

The limited amount of garbage dump space requires a maximum degree of utilization. This means that the greatest possible dump volume must be available on the smallest possible area.

In the operation of garbage dumps, the current and expected laws on environmental protection, particularly the protection of soil and ground water, must be observed at the same time. This means that corresponding dump installations and dump structures, such as sealing structures, drainage, shafts and pumping stations, inspection walkways, etc. are required.

Compacting of the dump space formerly used, planned for the purpose of increasing dump utilization, goes hand in hand with the demand for uniform settling, and as little settling as possible, for the aforementioned dump sealing installations and structures.

In order to carry out this dump compacting work, it is known to drill down from the surface of the dump and place a depth vibrator to depths of up to 30 m and more; the drilling goes through all the layers of the dump and through the dump contents, which are unknown for the most part. In this process, barriers are encountered within the dump mass by means of the depth vibrator. In addition, the former driving surfaces for the dump vehicles have to be passed through, as layers with a slight thickness, but very high compaction in some instances.

While working through such barriers and precompacted layers, a large part of the vibration energy is converted to heat, because of the resistance hindering the work.

Because of this physical phenomenon, which necessarily occurs, a high level of operating risk can result.

This operating risk consists in the possibility that the motor of the depth vibrator can burn out or burn up, for one thing. This results in failure of the vibrator device, with the acute risk that the vibrator has to be left in the ground as lost, which is, of course, undesirable due to the significant financial value of a vibrator unit.

For another thing, the aforementioned operating risk consists in the possibility that the gases which are usually contained or formed in the garbage dumps might ignite and result in a dump fire.

To avert these primary risks, it is already known to operate the depth vibrator in such a way that a flushing fluid in the form of water or air flushing is added in the barrier zones in question.

However, this necessarily results in corresponding secondary risks, since in the case of water flushing, harmful dump substances are dissolved, with the result of infiltration into the soil and ground water. In contrast, when air flushing is used, the oxygen feed is naturally increased, which increases the risk of fire and explosion in undesirable manner. In any case, the use of air flushing is excluded in cases of smoldering dumps or dumps which are already burning.

Therefore, the invention is based on the task of developing the method of the general type in such a way as to eliminate the disadvantages described, and so that it can be carried out without noticeably greater costs, in a safe and non-polluting manner, and with special effectiveness in terms of flushing, cooling, etc.

At the same time, a simplified apparatus for implementing this method is to be created.

This task is accomplished by the invention. Advantageous further developments of these are indicated in the dependent claims.

The significant thought of the invention lies in the use of flushing by means of liquid nitrogen, which is added as the flushing fluid during depth vibration.

Liquid nitrogen is available at an extremely low price on a large industrial scale (for example DM 0.01 to 0.02/L liquid nitrogen), and such a flushing fluid is particularly well suited for use in the sense provided according to the invention, since nitrogen is not only a colorless, tasteless and odorless gas, but also is extremely slow to react, so that all requirements of environmental tolerance and operational safety are satisfied right from the start.

According to the invention, the liquid nitrogen is added during depth vibration, either continuously or discontinuously, particularly when barriers are encountered in the dump mass, or when soil and subsoil layers are encountered, or if the vibrator temperatures rise to the maximum permissible limits. The latter can occur due to soil or barrier resistance and/or when the vibrator encounters burning, smoldering or other high temperature areas in a garbage dump.

The liquid nitrogen is added to the depth vibrator in suitable manner, specifically, for example, via a separate line in the annular space between the vibrator and the bore hole wall, with the liquid nitrogen being fed up to the vibrator. This line can be rigid or flexible, and is preferably structured as an insulated line.

Instead, the liquid nitrogen can also be added within the vibrator rods and/or the pipe behind the vibrator, or a bypass pipe can be provided which is connected with the vibrator and/or the vibrator rods and/or the pipe behind the vibrator.

If the depths of the dump mass which are being worked on are not very great, the liquid nitrogen can also be added directly from the dump surface into the annular space between the vibrator and the bore hole wall.

In each case, it is provided that the liquid nitrogen is fed into the direct vicinity of effect of the vibrator, specifically preferably in such a way that it exits at the vibrator tip.

In a practical further development of the invention, it is provided that the addition of the liquid nitrogen be controlled in terms of amount and/or addition time and/or temperature.

The use of liquid nitrogen as a flushing fluid for the depth vibration method, according to the invention, results in significant advantages, which are attributable, among other things but not exclusively, to the fact that the liquid nitrogen which is introduced into the ground evaporates due to heat conduction. The conversion of nitrogen from the liquid to the gaseous aggregate state which occurs also has the result that the nitrogen, which was introduced as a liquid, automatically returns to the dump surface in gaseous form. This return can be further promoted, according to the invention, by drawing off the evaporated nitrogen which flows towards the surface as a gas, using suction. In this connection, a cold evaporator system can be used, for example.

Due to the use of liquid nitrogen, according to the invention, the desired cooling of the depth vibrator including its exciter motor and all related machinery is achieved in an extremely effective manner.

In addition, effective cooling of the surrounding ground and substance medium is achieved. This has the result that any burning and smoldering areas are extinguished, so that no fires of any kind can occur any more.

Furthermore, any gaseous mixtures present in the ground are suppressed, so that the corresponding risks of ignition and explosion are safely eliminated.

Finally, there is also no detrimental effect on seepage water and ground water, since the liquid nitrogen which is introduced escapes upward automatically, as nitrogen gas, after it has evaporated, or is conducted off by means of separate suction.

The invention is described in greater detail in the following, on the basis of the drawing. This shows the method as well as the apparatus according to the invention in the single FIGURE in schematic form and in a vertical cross-section, i.e. implementation of the depth vibration method for the purpose of garbage dump compacting using liquid nitrogen flushing.

As is evident from the drawing, a garbage dump 10 is supposed to be compacted, one area after another, by means of the depth vibration method. In this connection, the garbage dump 10 has a composition at the vertical section shown, for example, such that it consists of an upper dump mass 1, a barrier layer 2 below that, as well as a lower dump mass 3.

To carry out the depth vibration method, a known depth vibrator 4 is used, which has vibrator rods 5 in its upper region as well as a vibrator tip 6 with exit openings 7 for flushing fluid 8 at its bottom end.

Liquid nitrogen is used as the flushing fluid 8; it is added to the depth vibrator 4 from the dump surface via a separate, insulated line 9, specifically in such a way that the liquid nitrogen 8 exits via the exit openings 7 at the lower vibrator tip 6. At this location, the liquid nitrogen 8 acts as a flushing fluid and as a coolant, with a conversion of the liquid nitrogen 8 from the liquid to the gaseous aggregate state taking place due to the heat conduction which takes place. The liquid nitrogen 8 therefore exits upwards out of the annular space formed between the vibrator 4 and the bore hole wall 11, in the form of nitrogen gas 13, and this can occur either automatically or by means of separate suction.

As is evident from the drawing, the depth vibrator 4 is held by a conventional vibrator carrier unit 12.

With regard to the characteristics of the invention which are not described in detail, explicit reference is made to the drawing as well as the claims.

I claim:

1. A method for compacting garbage dumps by means of depth vibration, which comprises placing at least one depth vibrator into bore holes drilled in one area of the dump after another, and vibrating and compacting the dump mass while a flushing fluid is added, wherein liquid nitrogen is added as the flushing fluid during the depth vibration, and wherein the liquid nitrogen used as the flushing fluid is introduced via separate line into the vibrator, exits from openings at a lower end of the vibrator and passes upwards through the annular space between the vibrator and the wall of the bore hole.

2. The method according to claim 1, wherein the vibrator has vibrator rods in its upper section and the liquid nitrogen is introduced through a space between the vibrator rods.

3. The method according to claim 1, wherein the liquid nitrogen is fed to the vibrator in such a way that it exits at the vibrator tip.

4. The method according to claim 1, wherein the amount, rate of addition and temperature of the liquid nitrogen which is added is controlled.

5. The method according to claim 1, wherein the liquid nitrogen is added discontinuously.

6. The method according to claim 1, wherein the liquid nitrogen is added continuously.

7. The method according to claim 1, wherein the liquid nitrogen added as the flushing fluid is drawn off by suction after it evaporates in the bore hole, in the form of nitrogen gas.

8. The method according to claim 7, wherein the nitrogen which is drawn off by suction is collected.

9. An apparatus for compacting garbage dumps by means of depth vibrator, which comprises a depth vibrator adapted for compacting a garbage dump, wherein the depth vibrator has a separate flushing fluid line to feed liquid nitrogen into the bore hole, wherein said flushing fluid line runs within said depth vibrator.

10. The apparatus according to claim 9, wherein the flushing fluid line is connected to the depth vibrator from the surface of the garbage dump as a separate, insulated line affixed to the depth vibrator.

11. The apparatus according to claim 9, wherein the flushing fluid line exits into openings at the vibrator tip.

12. The apparatus according to claim 9, wherein the vibrator includes a suction device for collecting nitrogen which has evaporated in the bore hole.

* * * * *